(12) United States Patent
Lee et al.

(10) Patent No.: US 10,175,543 B2
(45) Date of Patent: Jan. 8, 2019

(54) DISPLAY SUBSTRATE AND LIQUID CRYSTAL DISPLAY HAVING THE SAME

(71) Applicant: SAMSUNG DISPLAY CO., LTD., Yongin-si, Gyeonggi-Do (KR)

(72) Inventors: Su Jin Lee, Siheung-si (KR); Hyang Yul Kim, Hwaseong-si (KR); Jeong Ho Lee, Seoul (KR); Soo Jung Chae, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 178 days.

(21) Appl. No.: 15/000,794

(22) Filed: Jan. 19, 2016

(65) Prior Publication Data
US 2016/0363821 A1 Dec. 15, 2016

(30) Foreign Application Priority Data

Jun. 12, 2015 (KR) .................. 10-2015-0083400
Aug. 3, 2015 (KR) .................. 10-2015-0109441

(51) Int. Cl.
*G02F 1/1343* (2006.01)
*G02F 1/1333* (2006.01)
*G02F 1/1335* (2006.01)

(52) U.S. Cl.
CPC .. *G02F 1/134363* (2013.01); *G02F 1/133371* (2013.01); *G02F 1/133514* (2013.01); *G02F 1/134309* (2013.01); *G02F 2201/52* (2013.01)

(58) Field of Classification Search
CPC ......... G02F 1/133514; G02F 1/134363; G02F 1/133371
See application file for complete search history.

(56) References Cited

U.S. PATENT DOCUMENTS

| | | | |
|---|---|---|---|
| 8,130,344 B2 * | 3/2012 | Tsuchiya ........... | G02F 1/133514 349/107 |
| 2010/0066952 A1 * | 3/2010 | Tsuchiya ........... | G02F 1/133514 349/106 |
| 2013/0154911 A1 * | 6/2013 | Chen ................. | G02F 1/134336 345/87 |
| 2016/0124275 A1 * | 5/2016 | Bae ................... | G02F 1/134336 349/86 |
| 2016/0247825 A1 * | 8/2016 | Katsuta ............... | H01L 27/1222 |

FOREIGN PATENT DOCUMENTS

| KR | 1020060086742 | 8/2006 |
|---|---|---|
| KR | 1020080037132 | 4/2008 |
| KR | 1020120003216 | 1/2012 |
| KR | 1020140078382 | 6/2014 |

* cited by examiner

*Primary Examiner* — Dung Nguyen
(74) *Attorney, Agent, or Firm* — F. Chau & Associates, LLC

(57) ABSTRACT

A liquid crystal display (LCD) includes a first substrate that has a first pixel area with a first transmitting region and a first non-transmitting region and a second pixel area with a second transmitting region and a second non-transmitting region, a first pixel electrode disposed on the first substrate in the first pixel area, and a second pixel electrode disposed on the first substrate in the second pixel area. An area of the first pixel electrode in the first transmitting region is greater than that of the second pixel electrode in the second transmitting region, and an area of the first pixel electrode in the first non-transmitting region is less than that of the second pixel electrode in the second non-transmitting region.

11 Claims, 15 Drawing Sheets

DISPLAY SUBSTRATE AND LIQUID CRYSTAL DISPLAY HAVING THE SAME

This application claims priority under 35 U.S.C. § 119(a) from, and the benefit of, Korean Patent Application No. 10-2015-0083400 filed on Jun. 12, 2015 in the Korean Intellectual Property Office, and Korean Patent Application No. 10-2015-0109441 filed on Aug. 3, 2015 in the Korean Intellectual Property Office, the contents of both of which are herein incorporated by reference in their entireties.

BACKGROUND

1. Technical Field

Embodiments of the present disclosure are directed to a display substrate and a liquid crystal display (LCD) having the same.

2. Discussion of the Related Art

Liquid crystal displays (LCDs) have low power consumption due to low operating voltage and are portable. These features enable LCDs to be used in a wide variety of fields ranging from notebook computers to monitors, spacecraft, and airplanes. An LCD typically includes a lower substrate, an upper substrate, and a liquid crystal layer formed between the two substrates. In an LCD, an electric field applied to the liquid crystal layer adjusts the arrangement of liquid crystal molecules in the liquid crystal layer, thereby controlling the transmittance of light. As a result, an image can be displayed on an LCD.

In an LCD, a red, green, and blue color filter layer for color reproduction may be located between the lower substrate and the liquid crystal layer. Light that passes through the color filter layer may have different transmittance characteristics due to the color of the light. Red, green and blue light may have different maximum transmittances due to a cell gap which is a distance from an upper surface of the lower substrate to a lower surface of the upper substrate. With this taken into consideration, a multi-cell gap structure in which the color filter layer has different heights based on color has been suggested.

However, a multi-cell gap structure has a different liquid crystal capacitance value in each of the red, green and blue pixels, which can degrade display quality.

SUMMARY

Embodiments of the present disclosure can provide a liquid crystal display (LCD) having a multi-cell gap structure which can provide the same liquid crystal capacitance value in each pixel.

However, embodiments of the present disclosure are not limited to the one set forth herein. The above and other features of embodiments of the present disclosure will become more apparent to one of ordinary skill in the art to which embodiment of the present disclosure pertain by referencing the detailed description given below.

According to an embodiment of the present disclosure, there is provided a liquid crystal display (LCD). The LCD includes a first substrate that has a first pixel area with a first transmitting region and a first non-transmitting region, and a second pixel area with a second transmitting region and a second non-transmitting region, a first pixel electrode disposed on the first substrate in the first pixel area, and a second pixel electrode disposed on the first substrate in the second pixel area. An area of the first pixel electrode in the first transmitting region is greater than that of the second pixel electrode in the second transmitting region, and an area of the first pixel electrode in the first non-transmitting region is smaller than that of the second pixel electrode in the second non-transmitting region.

According to another embodiment of the present disclosure, there is provided a liquid crystal display (LCD). The LCD includes a first substrate that has a first pixel area with a first transmitting region and a first non-transmitting region, and a second pixel area with a second transmitting region and a second non-transmitting region, a first pixel electrode disposed on the first substrate in the first pixel area, and a second pixel electrode disposed on the first substrate in the second pixel area. A distance from the first substrate to the first pixel electrode in the first transmitting region is less than that from the first substrate to the second pixel electrode in the second transmitting region, and an area of the first pixel electrode in the first non-transmitting region is less than that of the second pixel electrode in the second non-transmitting region.

According to another embodiment of the present disclosure, there is provided a liquid crystal display (LCD). The LCD includes a first substrate that has a first pixel area with a first transmitting region and a first non-transmitting region, and a second pixel area with a second transmitting region and a second non-transmitting region, a first pixel electrode disposed on the first substrate in the first pixel area, a second pixel electrode disposed on the first substrate in the second pixel area; and a common electrode disposed on the first substrate under the first pixel electrode and the second pixel electrode. An overlap area between the first pixel electrode and the common electrode in the first non-transmitting region is less than an overlap area between the second pixel electrode and the common electrode in the second non-transmitting region, and a distance between the first pixel electrode and the common electrode in the first pixel area is equal to a distance between the second pixel electrode and the common electrode in the second pixel area.

Embodiments of the present disclosure can provide a LCD having a multi-cell gap structure which can provide the same liquid crystal capacitance value in each pixel.

DETAILED DESCRIPTION

Embodiments of the present disclosure will now be described more fully hereinafter with reference to the accompanying drawings, in which exemplary embodiments of the disclosure are shown. This disclosure may, however, be embodied in different forms and should not be construed as limited to the embodiments set forth herein. The same reference numbers may indicate the same components throughout the specification. In the attached figures, the thickness of layers and regions may be exaggerated for clarity.

Exemplary embodiments will hereinafter be described with reference to the accompanying drawings.

Figure 1:
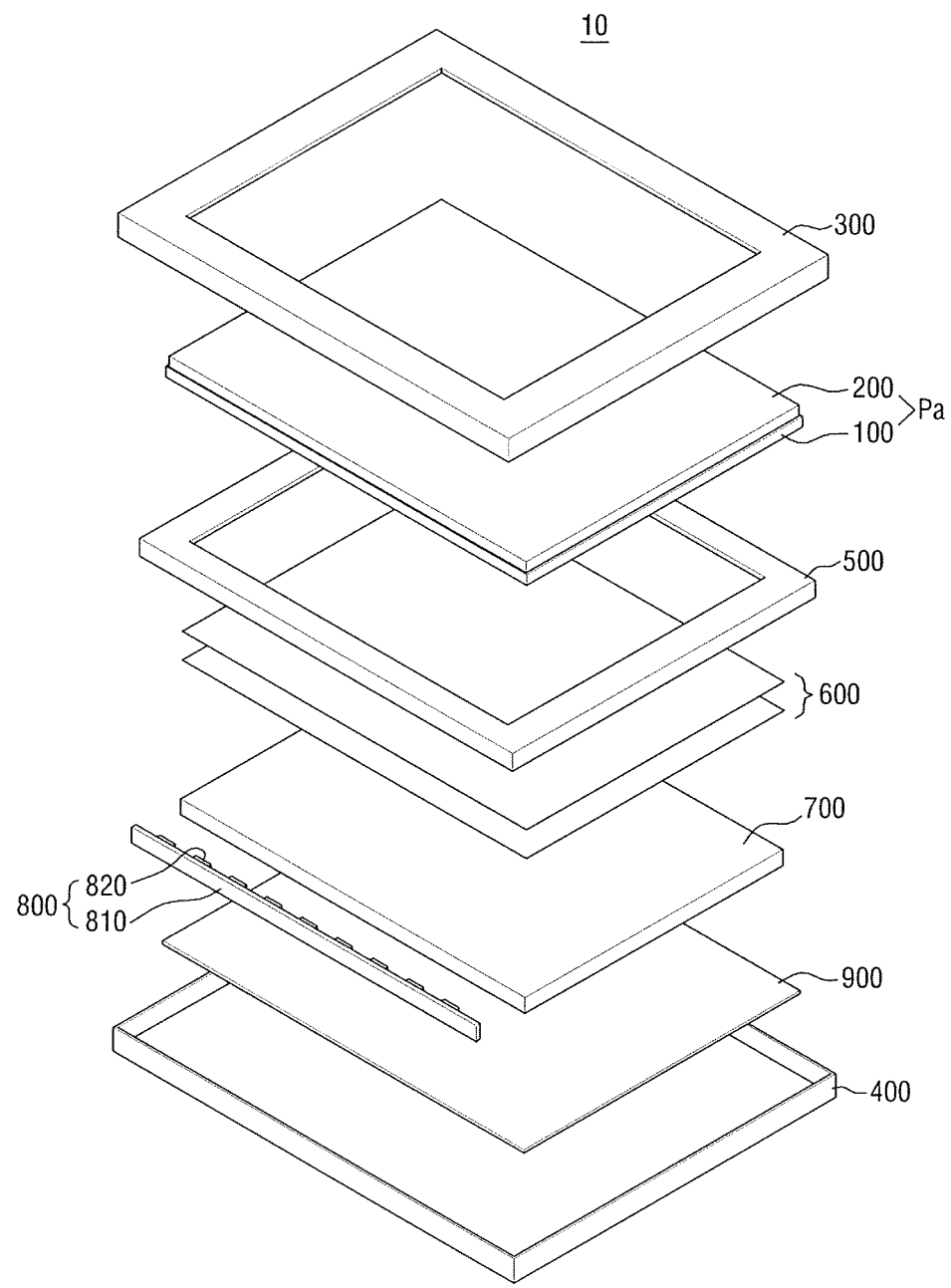
FIG. 1 is an exploded perspective view of a liquid crystal display (LCD) according to an embodiment of the present disclosure.

FIG. 1 is an exploded perspective view of a liquid crystal display (LCD) 10 according to an embodiment of the present disclosure. Referring to FIG. 1, the LCD 10 according to a current embodiment includes an LCD panel Pa, a backlight assembly, a top chassis 300, and a bottom chassis 400.

According to an embodiment, the LCD panel Pa includes a display area in which images are displayed and a non-display area in which no images are displayed. In addition, the LCD panel Pa includes a first display substrate 100, a second display substrate 200 which faces the first display substrate 100, and a liquid crystal layer interposed between the first display substrate 100 and the second display substrate 200.

Each of the first display substrate 100 and the second display substrate 200 may be shaped like a rectangular parallelepiped. However, while the first display substrate 100 and the second display substrate 200 are illustrated in FIG. 1 as having a rectangular parallelepiped shape for ease of description, embodiments are not limited thereto, and shapes thereof are not limited to rectangular parallelepipeds. Each of the first display substrate 100 and the second display substrate 200 can be fabricated in various shapes according to the shape of the LCD panel Pa. According to an embodiment, the liquid crystal layer is interposed between the first display substrate 100 and the second display substrate 200. In addition, a sealing member is placed between the first display substrate 100 and the second display substrate 200 along edges of the first display substrate 100 and the second display substrate 200 to bond and seal the first display substrate 100 and the second display substrate 200 together. In addition, according to an embodiment, the LCD panel Pa further includes a driving unit and a flexible printed circuit board (FPCB) attached to the first display substrate 100. The driving unit transmits to the first display substrate 100 various signals, such as a driving signal, needed to display an image in the display area. The FPCB outputs various signals to the driving unit. The first display substrate 100 is an array substrate that electrically controls the arrangement of liquid crystal molecules in the liquid crystal layer.

According to an embodiment, the backlight assembly is located under the LCD panel Pa, and includes a mold frame 500, an optical sheet 600, an LGP 700, a light source unit 800, and a reflective plate 900. The backlight assembly provides light to the LCD panel Pa. In the present specification, an edge-type backlight assembly in which the light source unit 800 is located on a side of the light guide plate (LGP) 700 is described. However, embodiments of the present disclosure are not limited to an edge-type backlight assembly, and embodiments of the present disclosure may use a direct-type backlight assembly in which a light source unit is located on a lower surface of a diffusion plate.

According to an embodiment, the light source unit 800 generates light and irradiates the generated light to the LGP 700. The light source unit 800 is disposed on a side surface, i.e., an incident surface, of the LGP 700. In an exemplary embodiment, the light source unit 800 can be placed along a long side of the LGP 700. However, embodiments of the present disclosure are not limited thereto, and the light source unit 800 may also be placed along a short side of the LGP 700. The light source unit 800 includes a circuit board 810 and a plurality of light sources 820 disposed on the circuit board 810.

According to an embodiment, the LGP 700 is located on a side of the light source unit 800. That is, the LGP 700 lies in substantially the same plane with the light source unit 800. The LGP 700 guides light emitted from the light source unit 800 to the LCD panel Pa.

According to an embodiment, the optical sheet 600 is disposed on the LGP 700. The optical sheet 600 modulates optical characteristics of light received from an exit surface of the LGP 700. The optical sheet 600 may be provided in a plurality, and the optical sheets 600 may be stacked on each other to overlap and complement each other. In an exemplary embodiment, the optical sheets 600 include at least one prism sheet or diffusion sheet.

According to an embodiment, the reflective plate 900 is disposed under the LGP 700. The reflective plate 900 changes the path of light propagating downward from the LGP 700 after being emitted from the light source unit 800. The reflective plate 900 is made of a reflective material such as metal.

According to an embodiment, the mold frame 500 is disposed between the LCD panel Pa and the optical sheets 600. The mold frame 800 engages with the bottom chassis 900, thereby fixing the light source unit 800, the LGP 700, the optical sheets 600, and the reflective plate 900. In addition, the mold frame 500 contacts edges of the LCD panel Pa, thereby supporting and fixing the LCD panel Pa.

According to an embodiment, the top chassis 300 covers the edges of the LCD panel Pa and surround side surfaces of the LCD panel Pa and the backlight assembly. The bottom chassis 900 houses the backlight assembly. The top chassis 800 and the bottom chassis 900 engage with each other to surround the LCD panel Pa and the backlight assembly. The top chassis 800 and the bottom chassis 900 can be made of a conductive material such as a metal.

Hereinafter, the first display substrate 100 of the LCD 10 will be described in detail.

Figure 2:
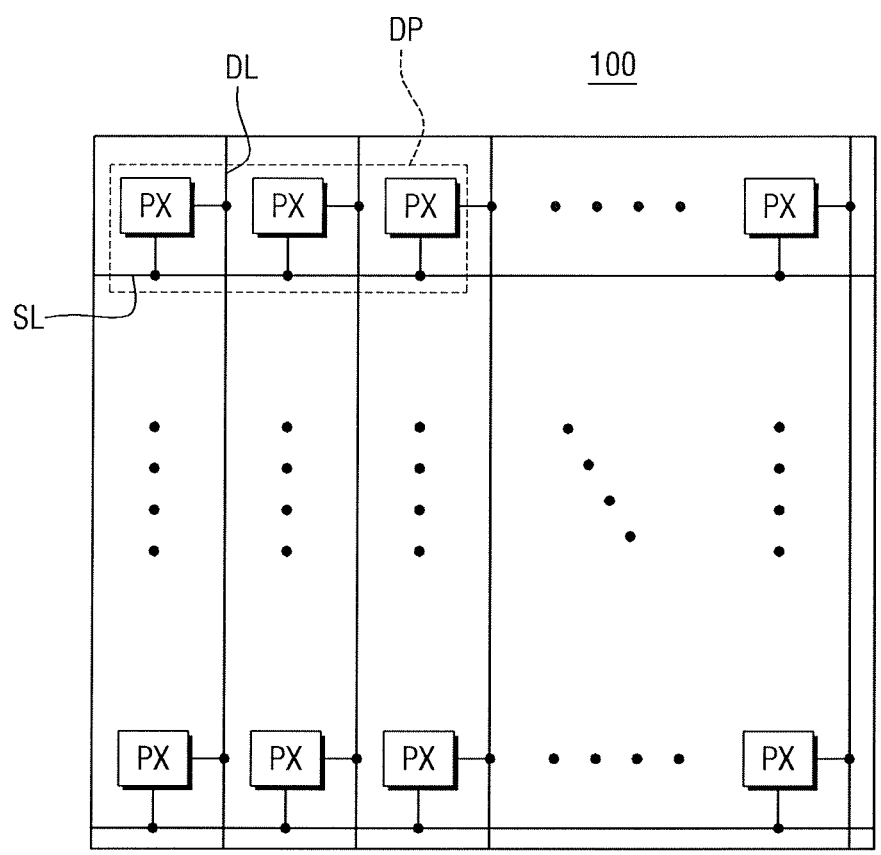
FIG. 2 is a schematic plan view of a first display substrate according to an embodiment of the present disclosure.
Figure 3:
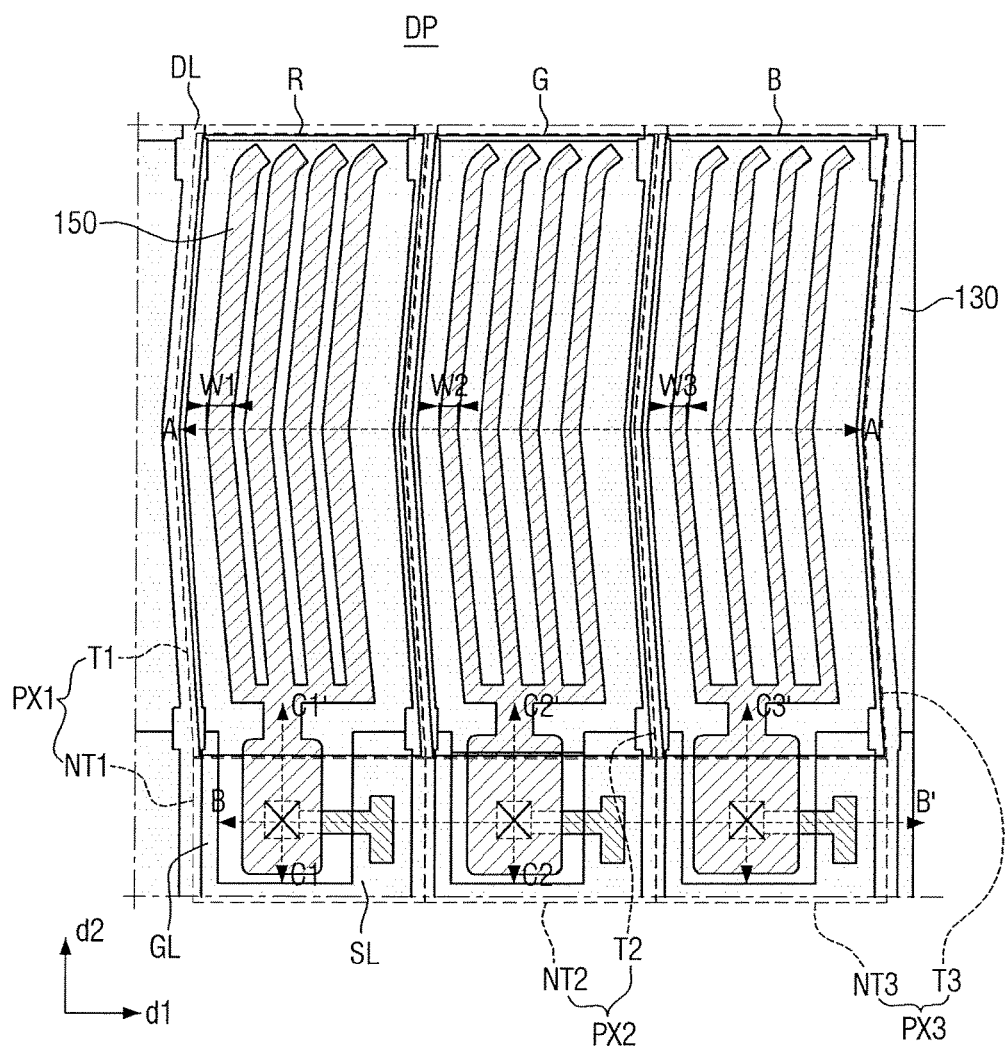
FIG. 3 is an enlarged plan view of an area 'DP' of FIG. 2.
Figure 4:
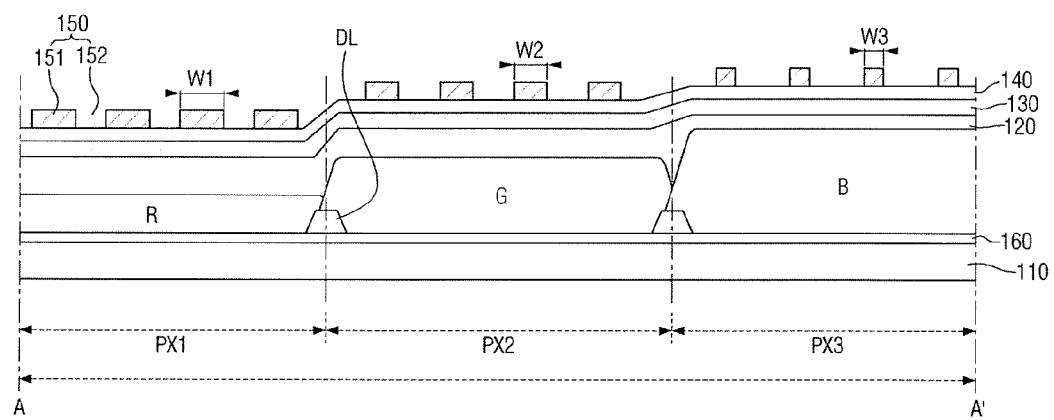
FIG. 4 is a cross-sectional view taken along the line A-A' of FIG. 3.
Figure 5:
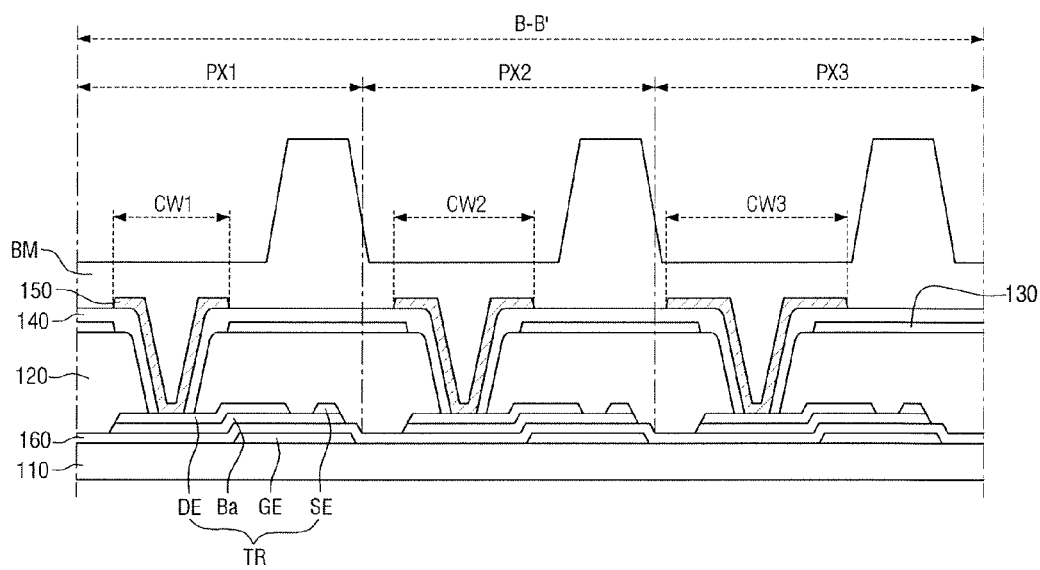
FIG. 5 is a cross-sectional view taken along the line B-B' of FIG. 3.
Figure 6:
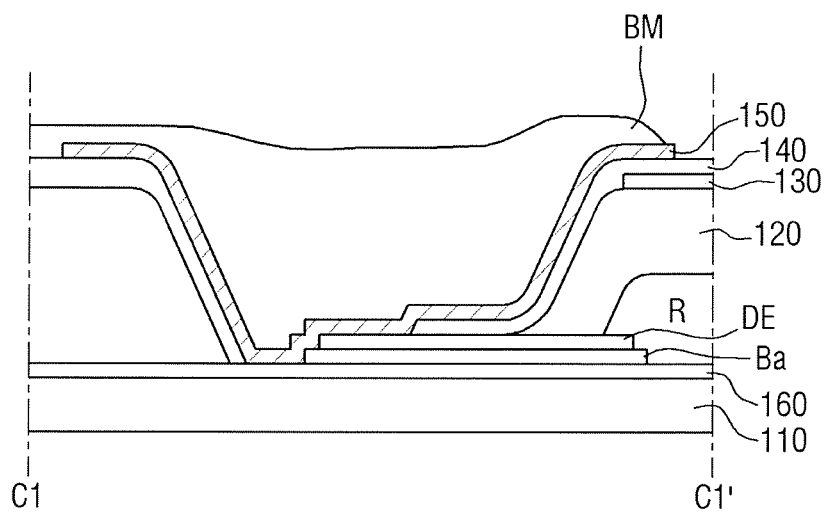
FIG. 6 is a cross-sectional view taken along the line C1-C1' of FIG. 3.
Figure 7:
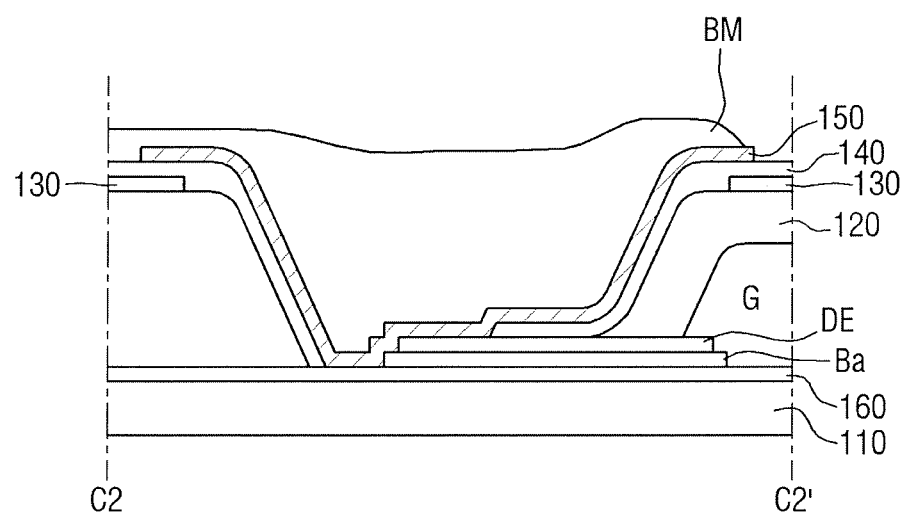
FIG. 7 is a cross-sectional view taken along the line C2-C2' of FIG. 3.
Figure 8:
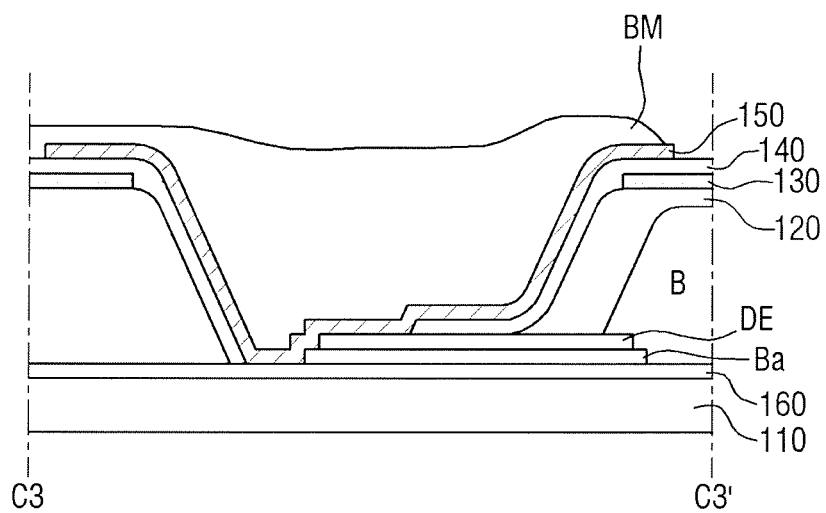
FIG. 8 is a cross-sectional view taken along the line C3-C3' of FIG. 3.

FIG. 2 is a schematic plan view of a first display substrate 100 according to an embodiment of the present disclosure. FIG. 3 is an enlarged plan view of an area 'DP' of FIG. 2. FIG. 4 is a cross-sectional view taken along the line A-A' of FIG. 3. FIG. 5 is a cross-sectional view taken along the line B-B' of FIG. 3. FIG. 6 is a cross-sectional view taken along the line C1-C1' of FIG. 3. FIG. 7 is a cross-sectional view taken along the line C2-C2' of FIG. 3. FIG. 8 is a cross-sectional view taken along the line C3-C3' of FIG. 3.

Referring to FIGS. 2 through 8, the first display substrate 100 includes a first substrate 110, a plurality of thin-film transistors (TFT) TR, a plurality of color filters R, G, and B, a first insulating layer 120, a common electrode 130, a second insulating layer 140, and a plurality of pixel electrodes 150. The first display substrate 100 according to the current embodiment is a lower substrate of an LCD. The first display substrate 100 includes an element which controls the transmittance of light received from thereunder.

According to an embodiment, the first substrate 110 is made of a material having light-transmitting, heat-resistant, and chemically resistant properties. For example, the first substrate 110 may be made from at least one of a glass, polyethylene naphthalate, polyethylene terephthalate and polyacryl, all having light-transmitting properties. The first substrate 110 includes a plurality of pixel areas PX. Each of the pixel areas PX is controlled by a different data voltage applied thereto at a different time. Each of the pixel areas PX may be an area operated independently by a gate line SL and a data line DL connected thereto or an area surrounded by a plurality of gate lines SL and a plurality of data lines DL. However, embodiments of the present disclosure are not limited thereto, and, in some embodiments, a plurality of pixel areas PX may be formed in one area surrounded by a plurality of gate lines SL and a plurality of data lines DL.

According to an embodiment, a plurality of gate lines SL are formed on the first substrate 110, and a gate insulating layer 160 is formed to cover the gate lines SL. A plurality of data lines DL are formed on the gate insulating layer 160. The gate lines SL and the data lines DL intersect each other with the gate insulating layer 160 interposed therebetween. The gate lines SL may be made of an aluminum (Al)-based metal such as aluminum or an aluminum alloy, a silver (Ag)-based metal such as silver or a silver alloy, a copper (Cu)-based metal such as copper or a copper alloy, a molybdenum (Mo)-based metal such as molybdenum or a molybdenum alloy, chrome (Cr), tantalum (Ta), or titanium (Ti). The gate insulating layer 160 may be made of silicon nitride (SiNx) or silicon oxide (SiOx) and may have a multilayer structure composed of at least two insulating layers having different physical properties. The data lines DL may be made of a refractory metal, such as molybdenum, chrome, tantalum or titanium, or an alloy of these metals. In addition, each of the data lines DL may have a multilayer structure composed of a refractory metal layer and a low resistance conductive layer. Examples of a multilayer include a double layer composed of a chrome or molybdenum (alloy) lower layer and an aluminum (alloy) upper layer, and a triple layer composed of a molybdenum (alloy) lower layer, an aluminum (alloy) intermediate layer and a molybdenum (alloy) upper layer. The gate lines SL transmit scan signals received from a gate driver, and the data lines DL transmit data voltages received from a data driver.

According to an embodiment, each of the pixel areas PX includes a transmitting region T1, T2 or T3 and a non-transmitting region NT1, NT2 or NT3. The transmitting regions T1 through T3 are regions in which the color filters R, G, B are located, and the non-transmitting regions NT1 through NT3 are regions in which the TFTs TR are located. Whether a region is the transmitting region T1, T2 or T3 or the non-transmitting region NT1, NT2 or NT3 can be determined based on whether light received from under the first substrate 110 passes through the region to propagate upward. According to an embodiment, a black matrix BM is located in the non-transmitting regions NT1 through NT3. Light received from under the first substrate 110 is blocked by the black matrix BM and thus fails to propagate upward from the first substrate 110. According to an embodiment, the color filters are located on the first substrate 110 to correspond to the transmitting regions T1 through T3 of the pixel areas PX, respectively. According to an embodiment, the TFTs TR are located on the first substrate to correspond to the non-transmitting regions NT1 through NT3 of the pixel areas PX, respectively. The TFTs TR charge the pixel electrodes 150 with data voltages of the data lines DL in response to a scan signal of a gate line SL. Each of the TFTs TR includes a gate electrode GE protruding from a gate line SL, a source electrode SE connected to a data line DL, a drain electrode DE connected to a pixel electrode 150, and a semiconductor active layer Ba which overlaps the gate line SL with the gate insulating layer 160 interposed therebetween to form a channel between the source electrode SE and the drain electrode DE. In addition, each of the TFTs TR may further include an ohmic contact member located between the semiconductor active layer Ba and each of the source electrode SE and the drain electrode DE. The ohmic contact member may be made of an n+ hydrogenated amorphous silicon material doped with an n-type impurity, such as phosphorous, or may be made of silicide. In addition, a protection layer may further be disposed on each of the TFTs TR to protect an exposed portion of the semiconductor active layer Ba.

According to an embodiment, the color filters have a dot shape in each of the transmitting regions T1 through T3, respectively. Each of the color filters transmits components of a particular wavelength range of incident light and blocks components of other wavelength ranges, such that output light is seen as a particular color. For example, the color filters may include a red filter R which transmits light in a wavelength range corresponding to red light, a green filter G which transmits light in a wavelength range corresponding to green light, and a blue filter B which transmits light in a wavelength range corresponding to blue light. Here, the wavelength range transmitted by the red filter R is approximately 580 to 780 nm, the wavelength range transmitted by the green color filter G is approximately 450 to 650 nm, and the wavelength range transmitted by the blue color filter B is approximately 380 to 560 nm.

Referring to FIG. 3, according to an embodiment, the red filter R, the green filter G and the blue filter B are located in the transmitting region T1 of a first pixel area PX1, the transmitting region T2 of a second pixel area PX2 and the transmitting region T3 of a third pixel area PX3, respectively. The first through third pixel areas PX1 through PX3 form one unit pixel area DP. The first pixel area PX1 may be a red subpixel, the second pixel area PX2 may be a green subpixel, and the third pixel area PX3 may be a blue subpixel. The pixel areas PX are a plurality of unit pixel areas arranged in a matrix.

The following description of the first through third pixel areas PX1 through PX3 is also applicable to other pixel areas. In addition, the colors and positions of the color filters described above is exemplary and non-limiting, and embodiments of the present disclosure are not limited thereto. For example, the color filters may be transparent to transmit light of all wavelength ranges.

Referring to FIG. 4, according to an embodiment, the color filters are formed on the gate insulating layer 160. The color filters on the first display substrate 10 can prevent light leakage and aperture ratio reduction due to misalignment with an upper substrate. The red filter R is formed on a portion of the gate insulating layer 160 which corresponds to the transmitting region T1 of the first pixel area PX to transmit red light. The green filter G is formed on a portion of the gate insulating layer 160 which corresponds to the transmitting region T2 of the second pixel area PX to transmit green light. The blue filter B is formed on a portion of the gate insulating layer 160 which corresponds to the transmitting region T3 of the third pixel area PX3 to transmit blue light. Each of the color filters overlaps an adjacent color filter on a data line DL. The red filter R and the green filter G overlap each other on a data line DL between the red filter R and the green filter G, and the green filter G and the blue filter B overlap each other on a data line DL between the green filter G and the blue filter B. Here, red light transmitted from the red filter R, green light transmitted from the green filter G, and blue light transmitted from the blue filter B have different wavelengths as described above and exhibit different transmitting properties. Each of the red, green and blue filters R, G and B has a different maximum transmittance based on a distance travelled by light output therefrom. Blue light has a maximum transmittance at a shorter distance than green light, and red light has a maximum transmittance at a longer distance than green light. According to a current embodiment, the distance travelled by transmitted light corresponds to a distance from an upper surface of the first display substrate 100 to a lower surface of the upper substrate which covers the first display substrate 100, that is, a cell gap of the display device. Therefore, the red filter R, the green filter G and the blue filter B of the color filters of the first display substrate 100 according to a current embodiment can have different thicknesess in view of the maximum transmittances described above. The red filter R is thinner than the green filter Q, and the blue filter B is thicker than the green filter G The red filter R, the green filter G and the blue filter B are located side by side with each other to form steps, and an element disposed on the red filter R, the green filter G and the blue filter B also forms steps corresponding to the steps of the color filters. The first display substrate 100 according to a current embodiment has a multi-cell gap structure that provides high light transmittance by forming a different cell gap with the upper substrate according to the color of each color filter.

According to a current embodiment, a first insulating layer 120 is formed on the color filters and the TFTs TR. The first insulating layer 120 may be an organic insulating layer made of an organic matter. The first insulating layer 120 can block color mixing of the color filters R, G, B and prevent the TFTs TR from contacting other elements. In addition, the first insulating layer 120 can prevent the introduction of pigments from the color filters into other elements. The first insulating layer 120 on the color filters has steps corresponding to thicknesses of the color filters.

According to a current embodiment, a common electrode 130 is formed on the first insulating layer 120. The common electrode 130 also has steps corresponding to the steps of the first insulating layer 120. The common electrode 130 is a transparent conductive layer and forms a fringe field by interacting with the pixel electrodes 150. The common electrode 130 is a surface type and is formed as a single plate on the whole surface of the first insulating layer 120. The common electrode 130 may include openings formed in some regions of the non-transmitting regions NT1 through NT3. The common electrode 130 overlaps the transmitting regions T1, T2 and T3 of each pixel area PX. In addition, the common electrode 130 overlaps part of the non-transmitting regions NT1, NT2 and NT3 of each pixel area PX.

According to a current embodiment, a second insulating layer 140 is formed on the common electrode 130, and the pixel electrodes 150 are formed on the second insulating layer 140. According to a current embodiment, the second insulating layer 140 is made of an inorganic insulating material and has a uniform thickness over the pixel areas PX. Therefore, the same gap can be maintained between the common electrode 130 and the pixel electrode 150 in each pixel area PX.

According to a current embodiment, the pixel electrodes 150 correspond to the pixel areas PX, respectively. Each pixel electrode 150 overlaps the transmitting region T1, T2 or T3 of a pixel area PX and part of the non-transmitting region NT1, NT2 or NT3 of the pixel area PX. The pixel electrodes 150 are connected to the TFTs TR in the non-transmitting regions NT1 through NT3, respectively. The first insulating layer 120 and the second insulating layer 140 include contact holes at locations corresponding to the non-transmitting regions NT1 through NT3 of the pixel areas PX. The pixel electrodes 150 are connected to the drain electrodes DE of the TFTs TR via the contact holes and receive data voltages through the drain electrodes DE, respectively. Each pixel electrode 150 includes a plurality of branch electrodes 151 and at least one slit 152 corresponding to an opening between the branch electrodes 151. Each of the pixel electrodes 150 can form a fringe field by interacting with the common electrode 130.

According to a current embodiment, a liquid crystal capacitance formed by the common electrode 130 and each of the pixel electrodes 150 is proportional to an overlap area between the common electrode 130 and each of the pixel electrodes 150. That is, the pixel electrodes 150 of the first display substrate 100 according to a current embodiment are formed according to the thicknesses of the color filters. Accordingly, different liquid crystal capacitances can be formed in the transmitting regions T1, T2 and T3 of each pixel area PX.

A structure in which different liquid crystal capacitances are formed in the transmitting regions T1, T2 and T3 of each pixel area PX according to the stepped color filters is not limited to the structure of a current embodiment. This structure is applicable when the common electrode 130 is located on the upper substrate.

According to a current embodiment, the pixel electrodes 150 also overlap the common electrode 130 in the non-transmitting regions NT1 through NT3. Here, an overlap area between a pixel electrode 150 and the common electrode 130 in the non-transmitting regions NT1 through NT3 is different in each pixel area PX. This can compensate for differences in liquid crystal capacitances between the transmitting regions T1 through T3. The overlap area between a pixel electrode 150 and the common electrode 130 in each of the non-transmitting regions NT1 through NT3 is proportional to the thickness of the color filter corresponding to the pixel electrode 150. Even if a color filter is thick, liquid crystal capacitance may not be reduced by increasing the overlap area between the pixel electrode 150 and the common electrode 130 in each of the non-transmitting regions NT1 through NT3.

Specifically, according to a current embodiment, a pixel electrode 150 of the first pixel area PX1, a pixel electrode 150 of the second pixel area PX2 and a pixel electrode 150 of the third pixel area PX3 have different areas for connection to the drain electrode DE. That is, the area of the pixel electrode 150 connected to the drain electrode DE of the second pixel area PX2 is larger than that of the pixel electrode 150 connected to the drain electrode DE of the first pixel area PX1. The area of the pixel electrode 150 connected to the drain electrode DE of the third pixel area PX3 is larger than that of the pixel electrode 150 connected to the drain electrode DE of the first pixel area PX1.

Referring to FIG. 5 which is a cross-sectional view of each pixel area PX taken along a first direction d1, a cross-sectional area of each pixel electrode 150 connected to the drain electrode DE increases from the first pixel area PX1 toward the third pixel area PX3. A cross-sectional area CW2 of the pixel electrode 150 of the second pixel area PX2 is larger than a cross-sectional area CW1 of the pixel electrode 150 of the first pixel area PX1, and a cross-sectional area CW3 of the pixel electrode 150 of the third pixel area PX3 is larger than the cross-sectional area CW2 of the pixel electrode 150 of the second pixel area PX2. In addition, the cross-sectional area of each pixel electrode 150 taken along a second direction d2 perpendicular to the first direction d1 is larger in the second pixel area PX2 than in the first pixel area PX1 and larger in the third pixel area PX3 than in the second pixel area PX2. That is, the thickness of the color filter corresponding to each of the pixel electrodes 150 according to a current embodiment is proportional to the overlap area between the common electrode 130 and the pixel electrode 150 in each of the non-transmitting regions NT1 through NT3.

In addition, according to a current embodiment, the common electrode 130 has a larger area in the non-transmitting region NT2 of the second pixel area PX2 than in the non-transmitting region NT1 of the first pixel area PX1. That is, referring to FIGS. 6 through 8, in the non-transmitting regions NT1 through NT3 of the first through third pixel areas PX1 through PX3, the common electrode 130 adjacent to each region in which a pixel electrode 150 is connected to the drain electrode DE occupies a larger area in the second pixel area PX2 than in the first pixel area PX1, and occupies a larger area in the third pixel area PX3 than in the second pixel area PX2.

Accordingly, the overlap area between the pixel electrode 150 and the common electrode 130 is larger in the second pixel area PX2 than in the first pixel area PX1 and larger in the third area PX3 than in the second pixel area PX2. The overlap area between the pixel electrode 150 of the third pixel area PX3 and the common electrode 130 in the non-transmitting region NT3 is larger than the overlap area between the pixel electrode 150 of the second pixel electrode PX2 and the common electrode 130 in the non-transmitting region NT2. In addition, the overlap area between the pixel electrode 150 of the second pixel area PX2 and the common electrode 150 in the non-transmitting region NT2 is larger than the overlap area between the pixel electrode 150 of the first pixel area PX1 and the common electrode 130 in the non-transmitting region NT1.

Therefore, according to a current embodiment, as the common electrode 130 occupies a larger area in each of the first through third pixel areas PX1 through PX3, the overlap area between the common electrode 130 and the pixel electrode 150 increases. Thus, the common electrode 130 can increase the liquid crystal capacitance by forming an electric field with the pixel electrode 150 located thereon. Accordingly, this can compensate for differences in the liquid crystal capacitances between the transmitting regions T1 through T3 of the first through third pixel areas PX1 through PX3.

In the first display substrate 100 according to a current embodiment, an overlap area between a pixel electrode 150 and the common electrode 130 in a region in which the pixel electrode 150 is connected to the drain electrode DE varies according to the thickness of a corresponding color filter. This can prevent a change in liquid crystal capacitance due to a change in the color filter thickness, thereby preventing deterioration of display quality.

Hereinafter, an exemplary method of forming the pixel electrodes 150 of the first display substrate 100 will be described.

FIGS. 9A through 9E are cross-sectional views sequentially illustrating steps of a process of forming the pixel electrodes 150 on the second insulating layer 140.

Figure 9A:
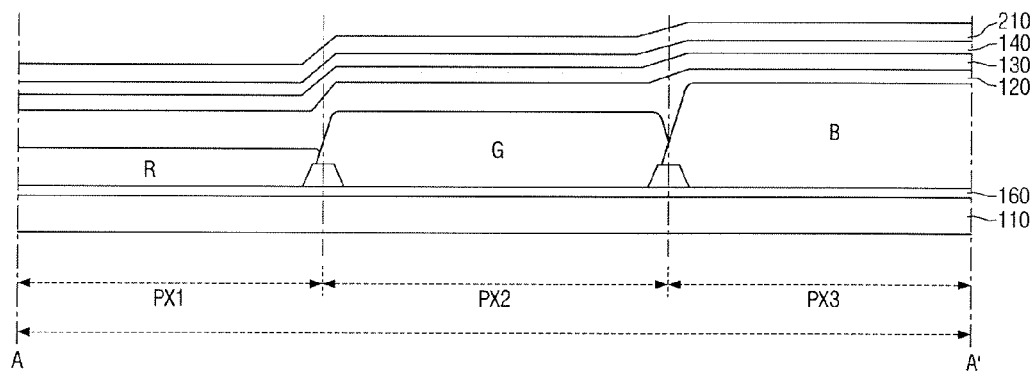
FIGS. 9A through 9E are cross-sectional views sequentially illustrating steps of a process of forming pixel electrodes on a second insulating layer.

Referring to FIG. 9A, a conductive material layer 210 is formed on a surface of the second insulating layer 140.

According to a current embodiment, the conductive material layer 210 is made of a transparent conductive material. For example, the conductive material layer 210 may be made of a transparent conductive oxide such as indium tin oxide (ITO), indium zinc oxide (IZO), or fluorine-doped tin oxide (FTO).

Figure 9B:
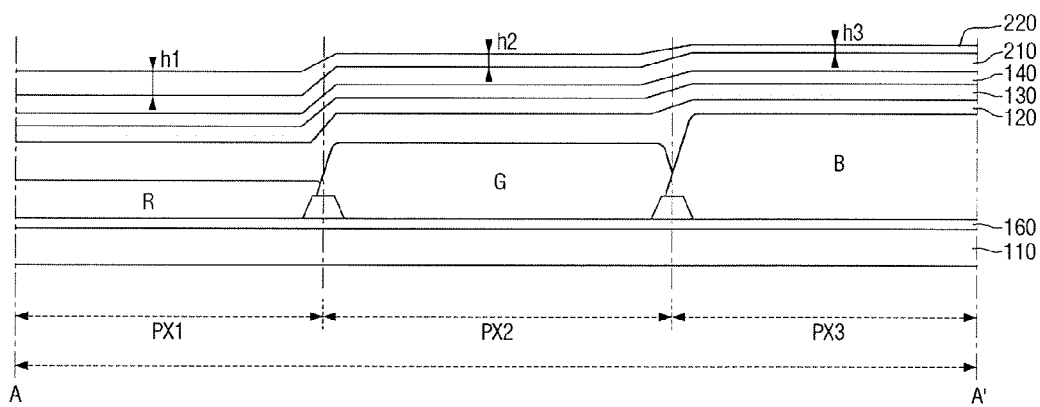

Referring to FIG. 9B, a photoresist layer 220 is formed. According to a current embodiment, the photoresist layer 220 is any one of a positive type photoresist layer where regions irradiated with ultraviolet (UV) light are removed or a negative type photoresist layer where regions irradiated with UV light remain. In a current embodiment, a case in which the photoresist layer 220 is a positive type photoresist layer will be described as an example. Some regions of the photoresist layer 220 remain after a development step, which will be described below, regardless of the type of the photoresist layer 220. Therefore, the remaining regions of the photoresist layer 220 can protect some regions of the conductive material layer 210 formed thereunder.

The color filters disposed under the photoresist layer 220 form steps, thus causing the photoresist layer 220 stacked thereon to have a different thickness in each region. The non-uniform thickness of the photoresist layer 220 results from steps formed by elements located under the photoresist layer 220. Specifically, the color filters increase in thickness in the order of the red filter R, the green filter and the blue filter B. Therefore, a height from the surface of the first substrate 110 to surfaces of the color filters increases in the order of the red filter R, the green filter G and the blue filter B.

The first insulating layer 120 disposed on the color filters can function to some extent as a planarization layer. However, the first insulating layer 120 can fail to completely planarize the surfaces of the color filters. Instead, the first insulating layer 120 partially reflects the steps formed between the color filters. That is, the first insulating layer 120 is thickest in the first pixel area PX1 in which the red filter R is formed and becomes thinner toward the second pixel area PX2 in which the green filter G is formed and the third pixel area PX3 in which the blue filter B is formed. However, the height from the surface of the first substrate 110 to the surfaces of the color filters still increases from the first pixel area PX1 to the second pixel area PX2 and the third pixel area PX3. Therefore, a surface of the first insulating layer 120 has steps.

Likewise, the common electrode 130 and the second insulating layer 140 disposed on the first insulating layer 120 also have surface steps that reflect the steps formed on the surface of the first insulating layer 120 thereunder. The degree to which there are surface steps depends on planarization properties. For example, a thickly coated organic material increases planarization properties, thereby reducing the height differences of the surface steps. On the other hand, a thinly deposited inorganic material reduces planarization properties because it is conformally deposited along a lower profile. Therefore, the surface steps may be fully exposed. Since the common electrode 130 and the second insulating layer 140 are made of an inorganic material, they almost fully expose the surface steps of the first insulating layer 120. For the same reason, the conductive material layer 210 deposited on the second insulating layer 140 fully exposes the surface steps of the first insulating layer 120, thus exposing a step with a different height in each region.

On the other hand, since the photoresist layer 220 is made of an organic material, it generally has superior planarization properties. Therefore, the photoresist layer 220 has a greatest thickness hl in the first pixel area PX1 in which a height from the surface of the first substrate 110 to the conductive material layer 210 is relatively low, and a least thickness h3 in the third pixel area PX3 in which the height from the surface of the first substrate 110 to the conductive material layer 210 is relatively high. However, superior planarization properties do not necessarily ensure a flat surface, and the surface of the photoresist layer 220 can also, to some extent, have steps.

Figure 9C:
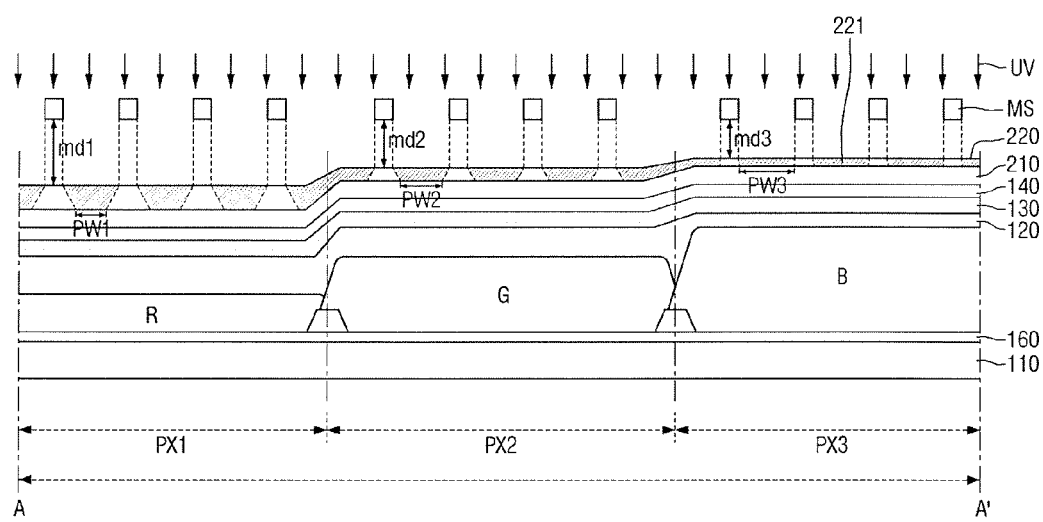

Referring to FIG. 9C, the photoresist layer 220 is selectively exposed using an optical mask MS.

The optical mask MS is located at an equal distance from the first substrate 110 in the first through third pixel areas PX1 through PX3.

According to a current embodiment, since a distance between the photoresist layer 220 and the optical mask MS differs in each area, UV light may be irradiated to the first pixel area PX at a relatively low intensity and irradiated to the third pixel area PX3 at a relatively high intensity. That is, a distance md3 between the photoresist layer 220 and the optical mask MS in the third pixel area PX3 is less than a distance md1 between the photoresist layer 220 and the optical mask MS in the first pixel area PX1. Therefore, the photoresist layer 220 may be differently exposed to the UV light in each of the first through third pixel areas PX1 through PX3.

In addition, the first through third pixel areas PX1 through PX3 can be irradiated with UV light of the same intensity. Even in this case, however, since the photoresist layer 220 of the first pixel area PX1 is thicker than the photoresist layer 220 of the third pixel area PX3, a lower photoresist layer 220 region in the first pixel area PX1 is affected less by UV light than a lower photoresist layer 220 region in the third pixel area PX3.

Consequently, due to different distances between the photoresist layer 220 and the optical mask MS in each area and different thicknesses of the photoresist layer 220 in each area, gaps pw1, pw2 or pw3 between patterns of the photoresist layer 220 at a boundary between the photoresist layer 220 and the conductive material layer 210 differ. That is, at the boundary between the photoresist layer 220 and the conductive material layer 210, the gaps pw1, pw2 or pw3 between the patterns of the photoresist layer 220 are smallest in the first pixel area PX1 and largest in the third pixel area PX3.

In addition, after irradiating UV light to the photoresist layer 220, a development process may be performed to remove exposed regions 221 of the photoresist layer 220. According to a current embodiment, the exposed regions 221 of the photoresist layer 220 are removed. However, the shape of the removed portions of the photoresist layer 220 can differ depending on the method and material used in the development process. Even in this case, the photoresist layer 220 is removed to a different degree in each of the first through third pixel areas PX1 through PX3.

Figure 9D:
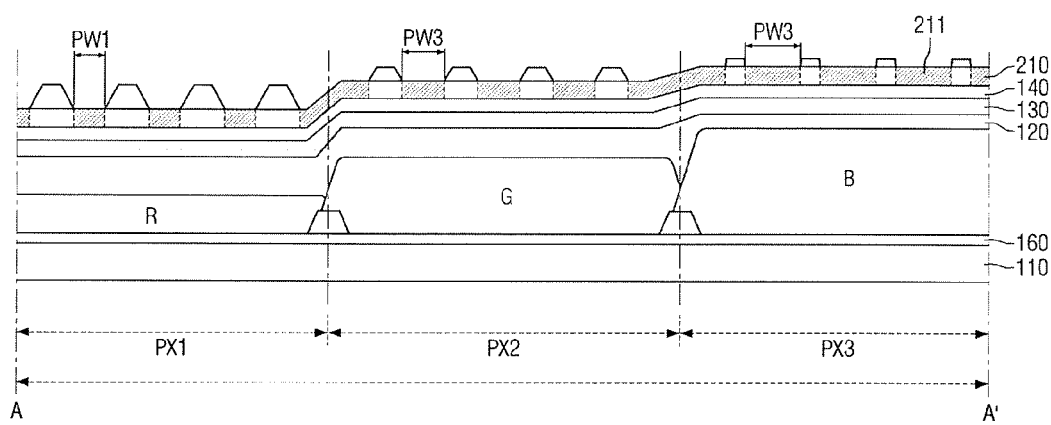

Referring to FIG. 9D, according to a current embodiment, an etching process is performed to remove regions 211 of the conductive material layer 210 which are overlapped by the exposed regions 221 of the photoresist layer 220. In this case, the shaded regions 211 of the conductive material layer 210 are removed. In the etching process, the shape of the removed portions of the conductive material layer 210 can differ, depending on the method and material used in the etching process. Even in this case, the conductive material layer 210 may be removed to a different degree in each of the first through third pixel areas PX1 through PX3.

Figure 9E:
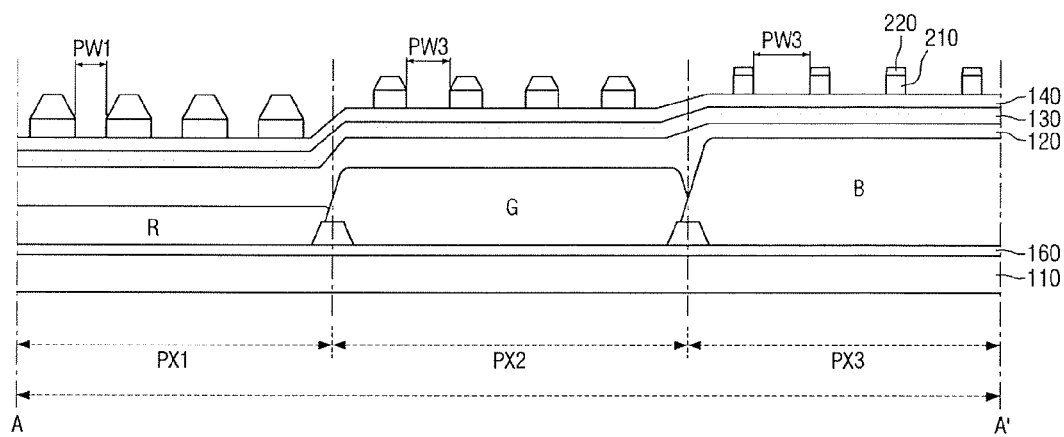

Referring to FIG. 9E, according to a current embodiment, the remaining photoresist layer 220 is removed. As a result, the pixel electrodes 150 as illustrated in FIG. 4 can be formed.

That is, a width W1 of the branch electrodes 151 of the first pixel area PX1 corresponding to the thin red filter R is greater than a width W2 of the branch electrodes 151 of the second pixel area PX2 corresponding to the green filter G, and a width W3 of the branch electrodes 151 of the third pixel area PX3 corresponding to the thick blue filter B is greater than the width W2 of the branch electrodes 151 of the second pixel area PX2 corresponding to the green filter G. That is, the width of the branch electrodes 151 of each pixel electrode 150 is inversely proportional to the thickness of a corresponding color filter.

Since a cross-sectional view has been used to describe the above process, the width of the branch electrodes 151 of each pixel electrode 150 has been described as a major variable. However, the above phenomenon also occurs in a cross-section taken along another direction. Consequently, as illustrated in FIG. 3, the pixel electrode 150 occupies a different area in each of the transmitting regions T1 through T3 of the first through third pixel areas PX1 through PX3.

As described above, the LCD 10 according to embodiments of the present disclosure can minimize the effect of area differences of the pixel electrode 150 in the transmitting regions T1 through T3 of the first through third pixel areas PX1 through PX3 by adjusting the overlap area between the pixel electrode 150 and the common electrode 130 in each of the non-transmitting regions NT1 through NT3.

Hereinafter, a first display substrate according to another embodiment of the present disclosure will be described.

Figure 10:
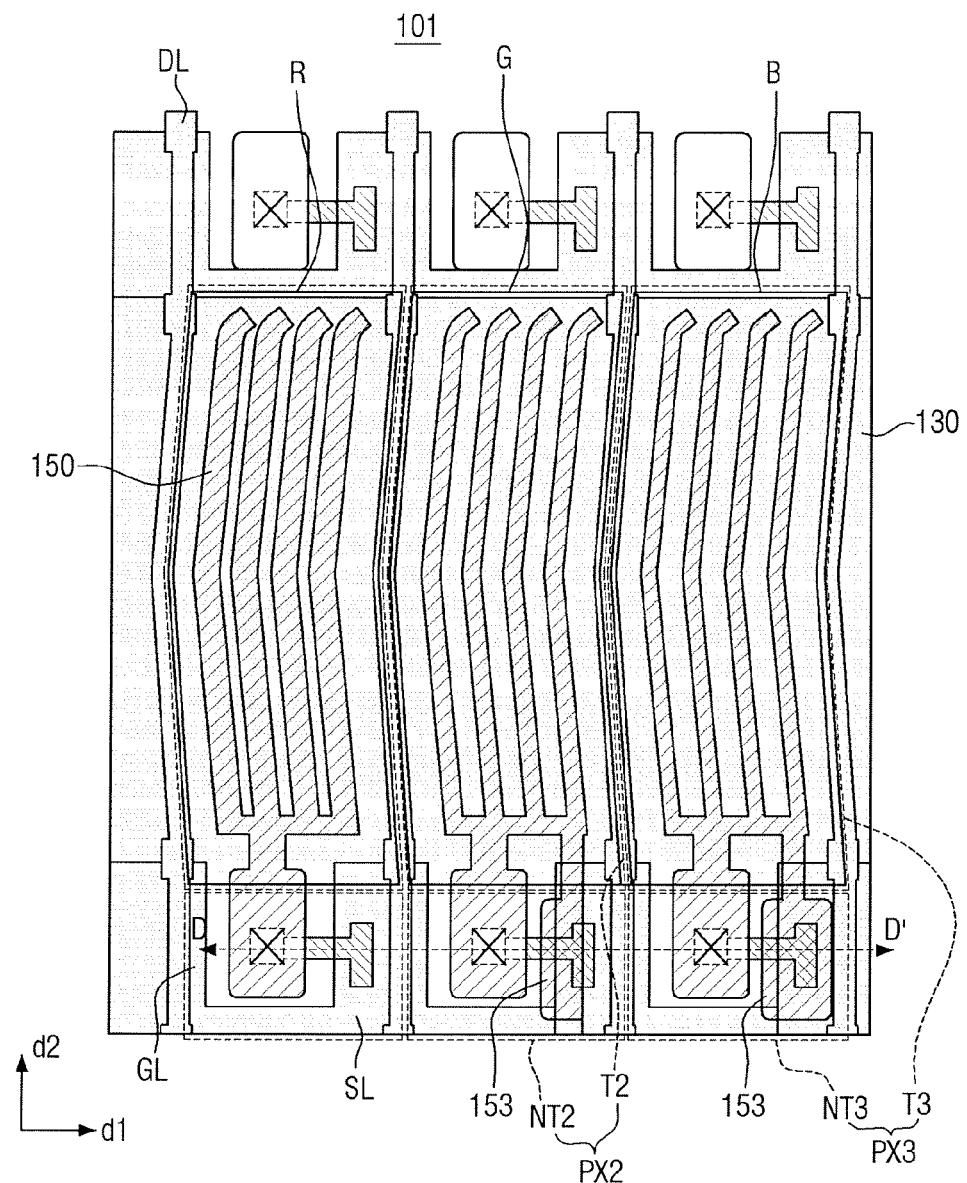
FIG. 10 is a plan view of a first display substrate according to an embodiment of the present disclosure.
Figure 11:
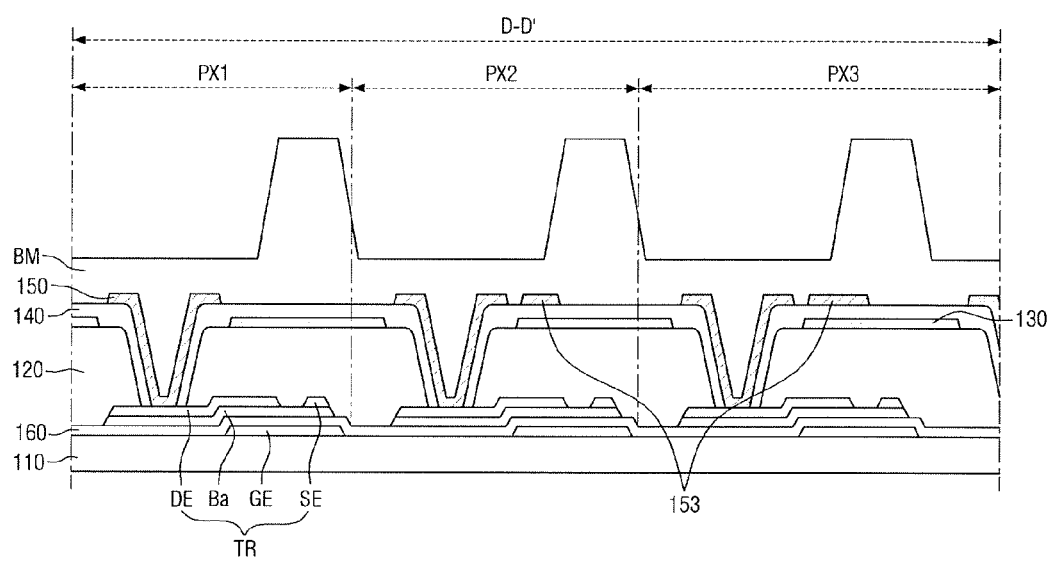
FIG. 11 is a cross-sectional view taken along the line D-D' of FIG. 10.

FIG. 10 is a plan view of a first display substrate 101 according to another embodiment of the present disclosure. FIG. 11 is a cross-sectional view taken along the line D-D' of FIG. 10. In a current embodiment, elements substantially identical to those described above may be indicated by like reference numerals, and a redundant description thereof will be omitted or given briefly.

Referring to FIGS. 10 and 11, according to a current embodiment, a red filter R, a green filter G and a blue filter B respectively overlap a first pixel area PX1, a second pixel area PX2 and a third pixel area PX3 arranged successively in the first display substrate 101. The first through third pixel areas PX1 through PX3 form one unit pixel area DP. The first pixel area PX1 may be a red subpixel, the second pixel area PX2 may be a green subpixel, and the third pixel area PX3 may be a blue subpixel. The red filter R may be thinner than the green filter C; and the blue filter B may be thicker than the green filter G. The red filter R, the green filter G and the blue filter B are located side by side with each other to form steps, and an element disposed on the red filter R, the green filter G and the blue filter B also forms steps corresponding to the steps of the color filters. According to a current embodiment, the first display substrate 101 has a multi-cell gap structure that provides high light transmittance by forming a different cell gap with an upper substrate opposite the first display substrate 101, according to the color of each color filter. Different liquid crystal capacitances are formed in each of the first through third pixel areas PX1 through PX3 due to a stepped color filter. However, in region other than transmitting regions T1 through T3 of the first display substrate 101, the difference in liquid crystal capacitance can be compensated by varying an overlap area between a pixel electrode 150 and a common electrode 130 in each of the first through third pixel areas PX1 through PX3.

According to a current embodiment, the common electrode 130 and the pixel electrode 150 are formed in part of the transmitting regions T1, T2 or T3 and non-transmitting regions NT1, NT2 or NT3 of each of the first through third pixel areas PX1 through PX3. The common electrode 130 and the pixel electrode 150 also overlap part of each non-transmitting region NT1 through NT3 to connect to a drain electrode DE of a TFT TR. The common electrode 130 may be formed in each of the non-transmitting regions NT1 through NT3 to overlap the TFT TR thereunder.

According to a current embodiment, the pixel electrode 150 of the first display substrate 101 includes a protruding electrode 153 which protrudes toward each of the non-transmitting regions NT1 through NT3 of the first through third pixel areas PX1 through PX3. The protruding electrode 153 overlaps the TFT TR thereunder in each of the non-transmitting regions NT1 through NT3 and forms an electric field with the common electrode 130 above the TFT TR. The area of the protruding electrode 153 corresponds to a thickness of a corresponding color filter. That is, when a color filter corresponding to the pixel electrode 150 is thin, the area of the protruding electrode 153 is small. When the color filter corresponding to the pixel electrode 150 is thick, the area of the protruding electrode 153 is thick. In addition, if liquid crystal capacitances of other pixel areas PX2 and PX3 are compensated based on the first pixel area PX1, the protruding electrode 153 may not be formed in the first pixel area PX1. That is, each of the pixel electrodes 150 of the second pixel area PX2 and the third pixel area PX3 includes the protruding electrode 153 that overlaps the common electrode 130 with a predetermined area in view of a liquid crystal capacitance compensation value. The protruding electrode 153 of the third pixel area PX3 has a larger area than the protruding electrode 153 of the second pixel area PX2.

In the first display substrate 101 according to a current embodiment, the area of the protruding electrode 153 which overlaps the TFT TR disposed thereunder varies in each of the first through third pixel areas PX1 through PX3 based on the thickness of a corresponding color filter. That is, the area of the protruding electrode 153 is proportional to the thickness of the color filter. Accordingly, this can prevent changes in liquid crystal capacitance due to differences in the thickness of the color filter, thereby preventing deterioration of display quality. Other elements of the first display substrate 101 are substantially identical to those of the first display substrate 100 of FIGS. 2 through 10 identified by the same names, and thus a detailed description thereof is omitted.

Embodiments of the present disclosure can provide a high light transmittance.

In addition, each pixel can have the same liquid crystal capacitance, thereby improving display quality.

However, the effects of embodiments of the present disclosure are not restricted to the one set forth herein. The above and other effects of embodiments of the present disclosure will become more apparent to one of ordinary skill in the art to which the present disclosure pertains by referencing the claims.

What is claimed is:

1. A liquid crystal display (LCD) comprising:
a first substrate that includes a first pixel area having a first transmitting region and a first non-transmitting region and a second pixel area having a second transmitting region and a second non-transmitting region;
a first pixel electrode disposed on the first substrate in the first pixel area; and
a second pixel electrode disposed on the first substrate in the second pixel area,
wherein
an area of the first pixel electrode in the first transmitting region is greater than that of the second pixel electrode in the second transmitting region,
the area of the first pixel electrode in the first non-transmitting region is less than that of the second pixel electrode in the second non-transmitting region,
the first pixel electrode further comprises a first protruding electrode which protrudes from the first transmitting region into the first non-transmitting region,
the second pixel electrode further comprises a second protruding electrode which protrudes from the second transmitting region into the second non-transmitting region, and
an area of the second protruding electrode is greater than that of the first protruding electrode.

2. The LCD of claim 1, further comprising
a common electrode disposed on the first substrate under the first pixel electrode and the second pixel electrode,
wherein an overlap area between the first pixel electrode and the common electrode in the first non-transmitting region is less than an overlap area between the second pixel electrode and the common electrode in the second non-transmitting region.

3. The LCD of claim 2, wherein an area of the common electrode in the first non-transmitting region is less than that of the common electrode in the second non-transmitting region.

4. The LCD of claim 2, wherein a distance between the first pixel electrode and the common electrode in the first pixel area is equal to a distance between the second pixel electrode and the common electrode in the second pixel area.

5. The LCD of claim 1, further comprising:
a first thin-film transistor (TFT) disposed on the first substrate in the first non-transmitting region; and
a second TFT disposed on the first substrate in the second non-transmitting region,
wherein
the first and second TFTs are disposed under the first and second pixel electrodes,
the first protruding electrode overlaps the first TFT, and
the second protruding electrode overlaps the second TFT.

6. The LCD of claim 1, wherein
the first pixel electrode comprises a plurality of branch electrodes and a plurality of openings between the branch electrodes, and
the second pixel electrode comprises a plurality of branch electrodes and a plurality of openings between the branch electrodes,
wherein the branch electrodes of the first pixel electrode are wider than the branch electrodes of the second pixel electrode.

7. The LCD of claim 1, further comprising:
a first color filter disposed in the first transmitting region; and
a second color filter disposed in the second transmitting region,
wherein
the first color filter is disposed between the first substrate and the first pixel electrode,
the second color filter is disposed between the first substrate and the second pixel electrode, and the first color filter is thinner than the second color filter.

8. A liquid crystal display (LCD) comprising:
a first substrate that includes a first pixel area having a first transmitting region and a first non-transmitting region, a second pixel area having a second transmitting region and a second non-transmitting region; and a third pixel area disposed adjacent to the second pixel area and has a third transmitting region and a third non-transmitting region;
a first pixel electrode disposed on the first substrate in the first pixel area;
a second pixel electrode disposed on the first substrate in the second pixel area, and
a third pixel electrode disposed in the third pixel area, wherein
an area of the first pixel electrode in the first transmitting region is greater than that of the second pixel electrode in the second transmitting region,
the area of the first electrode in the first non-transmitting region is less than that of the second pixel electrode in the second non-transmitting region,
an area of the third pixel electrode in the third transmitting region is less than those of the first and second pixel electrodes in the first and second transmitting regions, and
the area of the third pixel electrode in the third non-transmitting region is greater than those of the first and second pixel electrodes in the first and second non-transmitting regions.

9. The LCD of claim 8, further comprising
a third color filter disposed in the third transmitting region, wherein the third color filter is disposed between the first substrate and the third pixel electrode, and the third color filter is thicker than the first and second color filters.

10. The LCD of claim 9, wherein the first through third color filters are red, green and blue color filters, respectively.

11. A liquid crystal display (LCD) comprising:
a first substrate that includes a first pixel area having a first transmitting region and a first non-transmitting region and a second pixel area having a second transmitting region and a second non-transmitting region;
a first pixel electrode disposed on the first substrate in the first pixel area;
a second pixel electrode disposed on the first substrate in the second pixel area,
a first TFT disposed on the first substrate in the first non-transmitting region; and
a second TFT disposed on the first substrate in the second non-transmitting region,
wherein
an area of the first pixel electrode in the first transmitting region is greater than that of the second pixel electrode in, the second transmitting region,
the area of the first pixel electrode in the first non-transmitting region is less than that of the second pixel electrode in the second non-transmitting region
the first and second TFTs are disposed under the first and second pixel electrodes, respectively,
the first pixel electrode and the first TFT are connected by a first contact hole disposed in the first non-transmitting region,
the second pixel electrode and the second TFT are connected by a second contact hole disposed in the second non-transmitting region, and
an area of an overlap of the first pixel electrode with the first contact hole that is less than that of an overlap of the second pixel electrode with the second contact hole.

* * * * *